United States Patent [19]

Yano

[11] 4,163,573
[45] Aug. 7, 1979

[54] HOSE FITTING

[75] Inventor: Kazuo Yano, Tokyo, Japan

[73] Assignee: Chiyoda Tsusho K.K., Tokyo, Japan

[21] Appl. No.: 882,198

[22] Filed: Feb. 28, 1978

[30] Foreign Application Priority Data

Feb. 28, 1977 [JP] Japan .................................. 52/021309
Aug. 31, 1977 [JP] Japan ............................ 52/115763[U]

[51] Int. Cl.² ............................................ F16L 55/00
[52] U.S. Cl. ..................................... 285/174; 285/175;
285/238; 285/276; 285/317; 285/340
[58] Field of Search ................ 285/340, DIG. 3, 317,
285/308, 276, 310, 238, 175, 174

[56] References Cited

U.S. PATENT DOCUMENTS

| | | | |
|---|---|---|---|
| 2,681,807 | 6/1954 | Krafft | 285/DIG. 3 |
| 3,411,814 | 11/1968 | Dillon | 285/340 |
| 3,884,508 | 5/1975 | Jones | 285/DIG. 3 |
| 3,900,221 | 8/1975 | Fouts | 285/276 |

FOREIGN PATENT DOCUMENTS 1222289 2/1971 United Kingdom .............. 285/DIG. 3

Primary Examiner—Dave W. Arola
Attorney, Agent, or Firm—Oblon, Fisher, Spivak, McClelland & Maier

[57] ABSTRACT

A hose fitting which comprises a body having a longitudinal fluid passage adapted to receive a hose, an O-ring provided in the fluid passage so as to give water- or air-tightness to a space formed between the outside surface of the hose inserted in the fluid passage and the surrounding wall thereof, a quick hose-disconnecting mechanism provided between the O-ring and the outlet of a fluid passage for gripping the hose in such a manner as to prevent reverse motion and disconnecting the hose by the aid of a single manual pressing operation, and a rotary joint provided rotatably at the inlet end of the fluid passage and adapted to be connected to a fluid supply source.

4 Claims, 6 Drawing Figures

HOSE FITTING

BACKGROUND OF THE INVENTION

1. Field of the Invention

The present invention relates to a hose fitting and, more particularly, to a new and novel hose fitting provided at one end with a quick hose-disconnecting mechanism and at the other end with a rotary joint adapted to be connected to a fluid supply source.

2. Description of the Prior Art

A conventional hose fitting is usually provided at its one open end with an externally threaded cylindrical portion which is adapted to be screwed into the internally threaded portion provided at one open end of a hose. However, with such a construction, connection and disconnection of a hose require much time and labor in, for instance, rotating the threaded portion. In addition, such a conventional hose fitting is provided at its other open end with an externally threaded cylindrical portion which is adapted to be screwed into the internally threaded portion of a fluid supply source terminal. However, with such a construction, connection and disconnection of a hose require much time and labor as mentioned above and, in addition, a screwed connection of this type tends to loosen due to lateral forces, for instance, when laterally pulled by a hose connected, and thereby causes fluid leakage.

BRIEF SUMMARY OF THE INVENTION

The present invention contemplates to eliminate the above-mentioned disadvantages of the prior art.

Therefore, it is an object of the present invention to provide a new and novel hose fitting which can perform connection and disconnection of a hose very simply, easily, rapidly and reliably.

It is another object of the present invention to provide a new and novel hose fitting which can be connected with a hose very securely and reliably.

It is still another object of the present invention to provide a new and novel hose fitting which can be disconnected from a hose in one simple pressing operation.

According to the present invention, there is provided a hose fitting comprising a body provided therein with a longitudinal fluid passage adapted to receive a hose through the outlet thereof, an O-ring provided on the surrounding wall of the fluid passage and in the vicinity of the inlet thereof so as to give water- or air-tightness to a space formed between the outside surface of the hose inserted in the fluid passage and the surrounding wall thereof, and a quick hose-disconnecting mechanism provided between the O-ring and the outlet of the fluid passage for receiving the hose therethrough, gripping the above hose in such a manner as to prevent reverse motion and disconnecting the above hose by the aid of a manual operation.

According to another aspect of the present invention, the above quick hose-disconnecting mechanism includes an annular retaining spring provided at the outlet of the fluid passage, an inclined ring provided on the annular retaining spring and supported thereby, a hose-gripping ring provided on the inclined ring for gripping the above hose, the above hose-gripping ring being adapted to rotate about its diametral axis, and a coil spring provided on the hose-gripping ring for at all times urging the hose-gripping ring toward the inclined ring.

According to still another aspect of the present invention, the above hose fitting further includes a rotary joint provided rotatably but axially immovably at the inlet end of the fluid passage and adapted to be connected to a fluid supply source terminal.

DETAILED DESCRIPTION OF THE PREFERRED EMBODIMENTS

Now, the present invention will be hereinafter described in detail with reference to the accompanying drawings in which like numerals and characters designate corresponding parts throughout the views.

Figure 1:
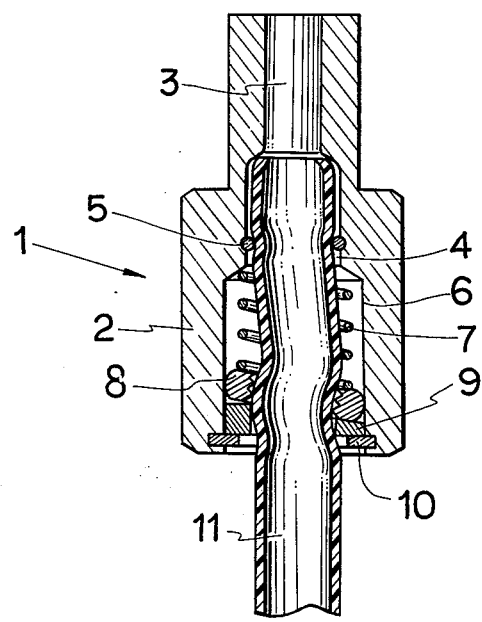
FIG. 1 is a longitudinal sectional view of a hose fitting according to a preferred embodiment of the present invention showing a hose inserted therein.
Figure 2:
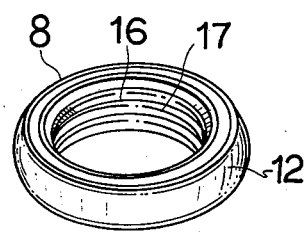
FIG. 2 is a perspective view of a hose-gripping ring for use with the embodiment shown in FIG. 1.
Figure 3:
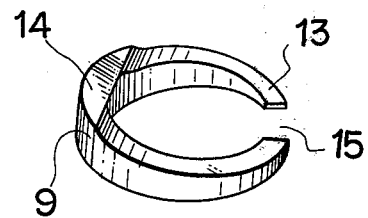
FIG. 3 is a perspective view of an inclined ring for use with the embodiment shown in FIG. 1.

Reference is first made to FIGS. 1, 2 and 3. Reference numeral 1 generally designates a hose fitting or coupling according to a preferred embodiment of the present invention. Reference numeral 2 designates the body of the hose fitting 1. The body 2 has a fluid passage 3 longitudinally provided therein. The fluid passage 3 is widened in diameter in the middle to form a first expanded portion 4 thereof in which an O-ring 5 is properly installed on the surrounding wall of the fluid passage 3 and in the vicinity of the inlet thereof. The fluid passage 3 is further expanded in diameter to form a second expanded portion 6 thereof between the first expanded portion 4 and the outlet thereof. In the second expanded portion 6, there is provided a quick hose-disconnecting mechanism consisting of a coil spring 7, a hose-gripping ring 8, an inclined ring 9 and an annular retaining ring 10 arranged in this order.

The quick hose-disconnecting mechanism will be hereinafter described in more detail. The annular retaining ring 10 is provided properly near the end of the second expanded portion 6 or near the outlet of the fluid passage 3 so as to come in contact with the outside surface of the inclined ring 9 to support it. Reference numeral 11 designates a hose inserted in the fluid passage 3 of fitting 1. The coil spring 7 is adapted to at all times urge the hose-gripping ring 8 toward the inclined ring 9. The gripping ring 8 has a circumferential surface 12 semicircular in section so that it may be rotated about its diametral direction in the second expanded portion 6 of the fluid passage 3. The inclined ring 9 has, on its internal end surface, an inclined area 13 and a flat area 14. The inclined area 13 is provided, at its lowermost portion, with a gap 15. The hose-gripping ring 8 is normally in contact with the inclined area 13 of the inclined ring 9 by the action of the coil spring 7 and therefore is kept inclined. Thus, in a connecting operation, the hose 11 which is preferably made of flexible and semi-hard synthetic resin or copper is inserted into the fluid passage 3, being advanced through the hose-gripping ring 8 against the inclining tendency thereof until it stops after passing through the O-ring 5. In this state, the O-ring 5 provides a water-tight or air-tight space between the outside surface of the hose 11 and the surrounding wall of the first expanded portion 4. The hose-gripping ring 8 exerts a bending force on the hose 11 owing to its inclining tendency caused by the action of the coil spring 7. Suitable projections 17 such as screw threads provided on the internal cylindrical surface 16 of the hose-gripping ring 8 are effective for providing proper frictional resistance between the hose-gripping ring 8 and the outside surface of the hose 11. Thus, if the hose 11 once inserted in the fluid passage 3 is given a pulling force, the hose-gripping ring 8 tends to be increasingly inclined owing to the above-mentioned frictional resistance and therefore the hose 11 is increasingly bent or more tightly gripped by the hose-gripping ring 8 while keeping its original shape because it has proper flexibility and strength. As a result, the above-mentioned frictional resistance is also increasingly enhanced. In other words, the hose-gripping ring 8 grips the hose 11 in such a manner as to prevent reverse motion or pulling motion, and therefore it becomes increasingly difficult to pull out the hose 11 as the pulling force given to the hose 11 increases. When it is desired to pull out or disconnect the hose 11 from the fitting 1, a suitable rod may be inserted in the fluid passage 3 of the fitting 1 through the gap 15 of the inclined ring 9 to press a part of the hose-gripping ring 8 so that the hose-gripping ring 8 may be decreased in inclination to become parallel with and come in contact with the flat area 14 of the inclined ring 9. In this state, the hose 11 may be easily pulled out. Thus, the hose 11 can be disconnected from the hose fitting 1 very easily by one pressing operation.

The above-mentioned hose fitting 1 may be connected at its inlet side to a fluid supply source through a conventional means as mentioned above. However, the conventional means has the above-mentioned disadvantages and therefore it is desirable to conform to the preferred embodiment of the present invention to be hereinafter described.

Figure 4:
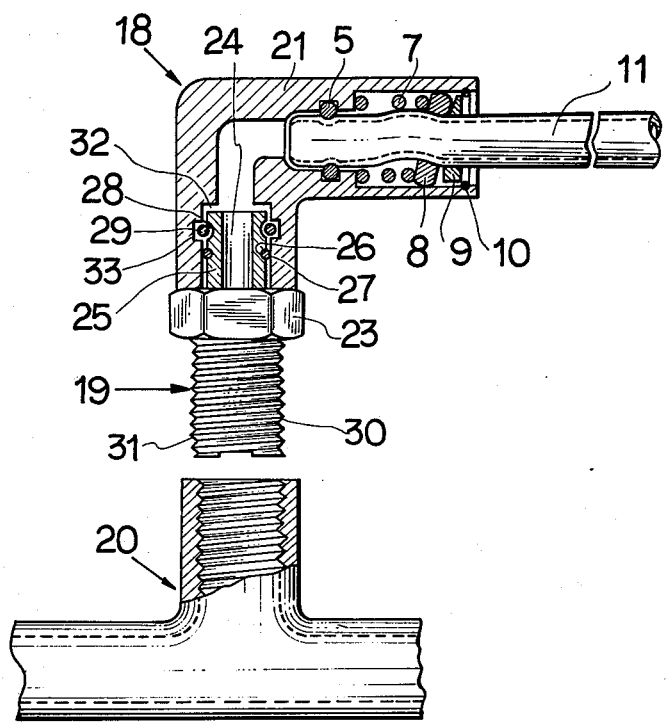
FIG. 4 is a longitudinal sectional view of a hose fitting according to another preferred embodiment of the present invention showing a hose inserted therein.
Figure 5:
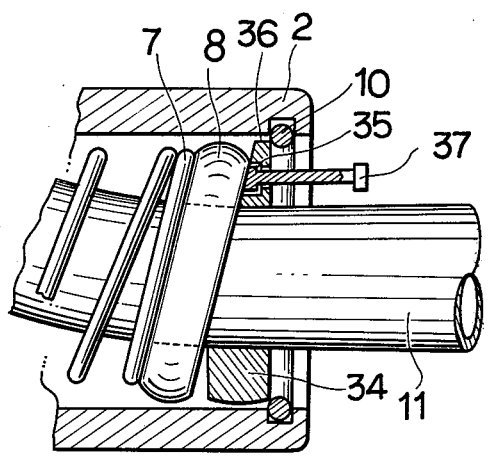
FIG. 5 is a sectional view of a modified form of the inclined ring of the present invention.
Figure 6:
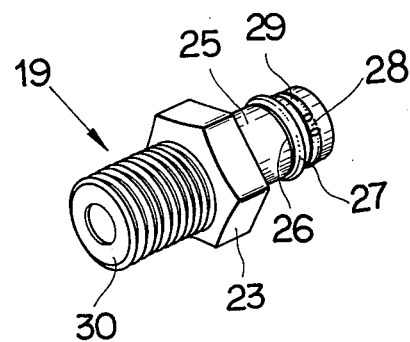
FIG. 6 is a perspective view of a rotary joint for use with the embodiment shown in FIG. 4.

In FIG. 4, numeral 18 generally designates a hose fitting or coupling according to another preferred embodiment of this invention. Though the fitting 18 shown in FIG. 4 is of L-shape, it may take any shape if suitable. Numeral 19 designates a rotary joint connected at its one end to one end of the hose fitting 18 and adapted to be connected at the other end to a fluid supply source terminal 20. Numeral 21 designates the body of the fitting 18. The rotary joint 19 is provided at its middle portion with a hexagonal nut section 23, which includes a longitudinal fluid passage 24 therein. Besides, the rotary joint 19 has a cylindrical section 25 provided in front of the hexagonal nut section 23. The cylindrical section 25 has, on its outside surface, an annular groove 26 in which an O-ring 27 is fitted and another annular groove 28 in which an annular retaining spring 29 is loosely fitted as shown in FIGS. 4 and 5. The rotary joint 19 has, at the rear of the nut section 23, another cylindrical section 30 on which an external thread 31 is formed. The fitting 18 has, at its one end, a cylindrical hole 32 for receiving the cylindrical section 25 of the rotary joint 19. An annular groove 33 is formed on the internal wall surface forming the hole 32 of the fitting 18. If the cylindrical section 25 of the rotary joint 19 is inserted in the hole 32 of the fitting 18, the annular retaining spring 29 is fitted in the annular groove 33 and therefore the cylindrical section 25 or the rotary joint 19 becomes unable to axially move though rotatable about its axis coming in pressing contact the O-ring 27 with the wall of the cylindrical hole 32 water-tightly or air-tightly under the influence of its elasticity to prevent leakage of fluid.

Since the rotary joint 19 is assembled as mentioned above, the threaded cylindrical section 30 thereof may be fixedly screwed in the fluid supply terminal 20 by rotating the hexagonal nut section 23 using a suitable means. Therefore, even if the fitting 18 is rotated, the rotary joint 19 does not become loose by any means and, as a result, fluid leakage is prevented.

The fitting 18 also has, at its another end, the above-mentioned quick hose-disconnecting mechanism, the effects of which can be greatly enhanced by provision of the rotary joint 19 since it enables the fitting 18 to freely change its position according to the direction from which the hose 11 is introduced.

In FIG. 5, the reference numeral 34 designates a modified form of the inclined ring 9 of the above embodiments. In addition, the reference numeral 35 designates a through hole provided at a position 36 of the inclined ring 34 corresponding to the position of the gap 15 of the above embodiments. The through hole 36 is increased in diameter at the side of the inclined surface 13 of the inclined ring 34. Reference numeral 37 designates a small rod loosely fitted in the through hole 35 and provided at its both ends with expanded heads so as to prevent it from slipping off the hole 36. If this small rod 37 is manually pressed to move the gripping ring 8 against the action of the spring 7, the gripping ring 8 is made substantially vertical to the hose 11 and as a result loses its grip on the hose 11, and the hose 11 is ready to be easily pulled out. With this construction, a separate small rod is not required when the hose is to be pulled out and therefore the above-mentioned quick hose-disconnecting mechanism can perform its function more effectively.

The foregoing parts may be made of brass or any other suitable metal or synthetic resin depending upon their properties such as strength and corrosion resistance according to purpose of the application.

It will be understood from the foregoing description that the hose fitting according to the present invention can be securely connected with or easily disconnected from a hose by such a simple and quick operation as to insert or pull out the hose. The hose fitting of the present invention is adapted to be connected to a fluid supply source through a rotary joint provided therein and therefore the above-mentioned hose connecting and disconnecting operation can be made much more easily. The hose fitting of the present invention may be used with various fluids including liquid and gas and can bring about remarkable effects much more than those of the prior art.

Obviously many modifications and variations of the present invention are possible in the light of the above teachings. It is therefore to be understood that within the scope of the appended claims the invention may be practiced otherwise than specifically described herein.

What is claimed as new and desired to be secured by Letters Patent of the United States is:

1. A hose fitting comprising a body provided therein with a longitudinal fluid passage adapted to receive a hose through the outlet thereof, an O-ring provided on the surrounding wall of said fluid passage and in the vicinity of the inlet thereof so as to give water- or air-tightness to a spaced formed between the outside surface of the hose inserted in said fluid passage and the surrounding wall thereof, and a quick hose-disconnecting mechanism provided between said O-ring and the outlet of said fluid passage for receiving said hose therethrough, gripping said hose in such a manner as to prevent reverse motion and disconnecting said hose by the aid of a manual operation, wherein said quick hose-disconnecting mechanism includes an annular retaining ring fixed to said body and provided at the outlet of said fluid passage, an inclined ring provided on said annular retaining ring and supporated thereby said inclined ring having at the end thereof opposite said annular retaining ring a surface inclined relative to the longitudinal axis of said longitudinal passage, and a flat surface perpendicular to said longitudinal axis, a hose-gripping ring supported on the inclined surface of said inclined ring, said hose gripping ring having an internal cylindrical surface for gripping said hose, when supported on said inclinded surface, said hose-gripping ring being adapted to rotate about its diametral direction and a coil spring in engagement with said hose-gripping ring and said body for at all times urging said hose-gripping ring against said inclined surface of said inclined ring;

whereby said hose-gripping ring is pivotable on said inclined ring at an intersection of said inclined surface and said flat surface to move said internal cylindrical surface out of hose gripping engagement to enable insertion and removal of said hose in said fitting.

2. The hose fitting as set forth in claim 1, wherein said inclined ring has a longitudinal through-hole provided at the lowermost edge of the inclined portion thereof and wherein a small rod provided at its both ends with expanded head and having a suitable length is loosely fitted in, which are larger than the smallest portion of said hole.

3. The hose fitting as set forth in claim 1, further comprising a rotary joint provided rotatably but axially immovably at the inlet end of said fluid passage and adapted to be connected with a fluid supply terminal.

4. A hose fitting according to claim 1, wherein said quick hose-disconnecting mechanism further comprises:
said internal cylindrical surface provided with a plurality of projections whereby the frictional gripping engagement between said hose-gripping ring and external surfaces of said hose is enhanced.

* * * * *